Oct. 2, 1928.
M. MAURAN
1,685,926
MULTIUNIT TANK CAR
Filed Sept. 15, 1926  2 Sheets-Sheet 1
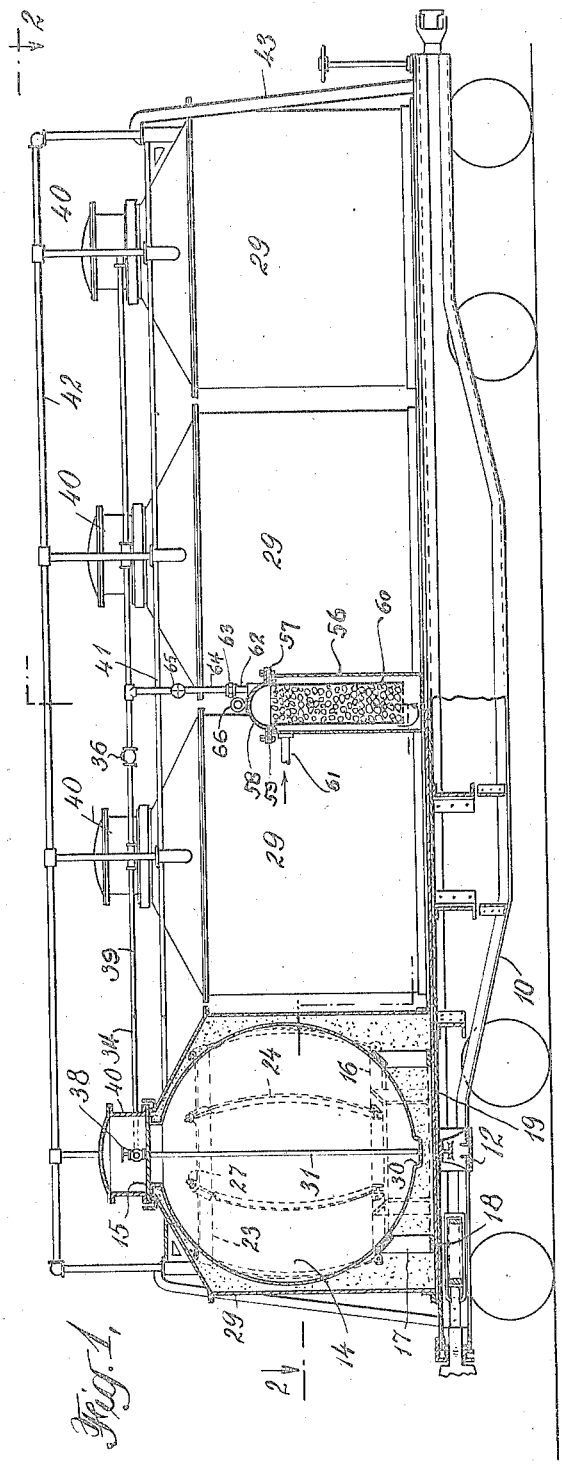
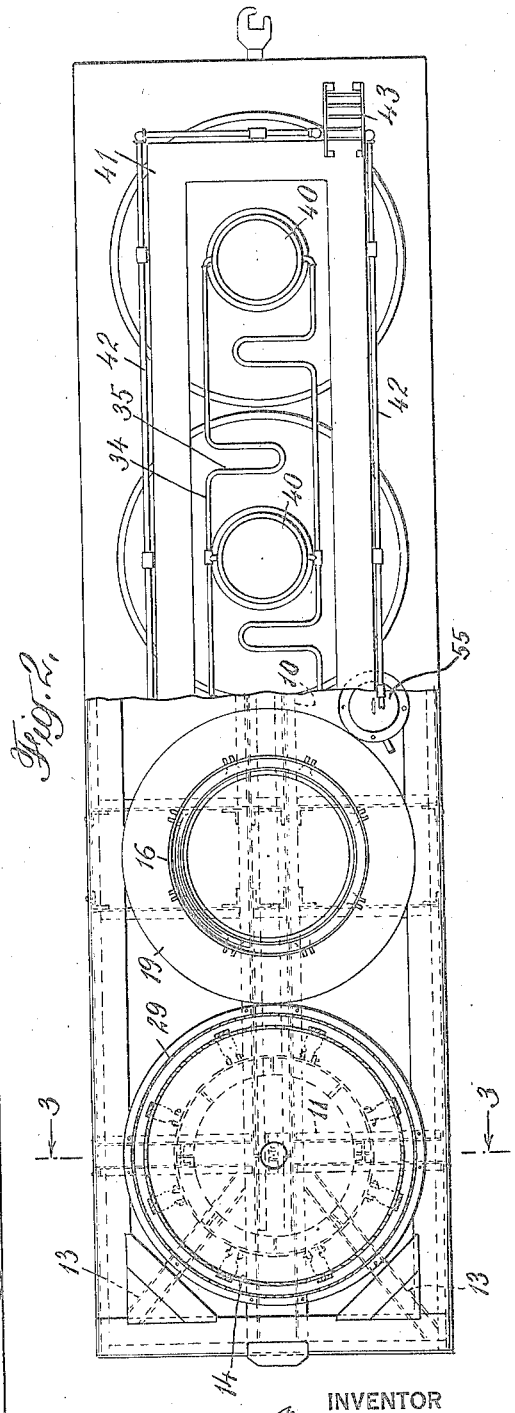
INVENTOR
Max Mauran
BY
Pennie, Davis, Marvin, Edmonds
ATTORNEYS

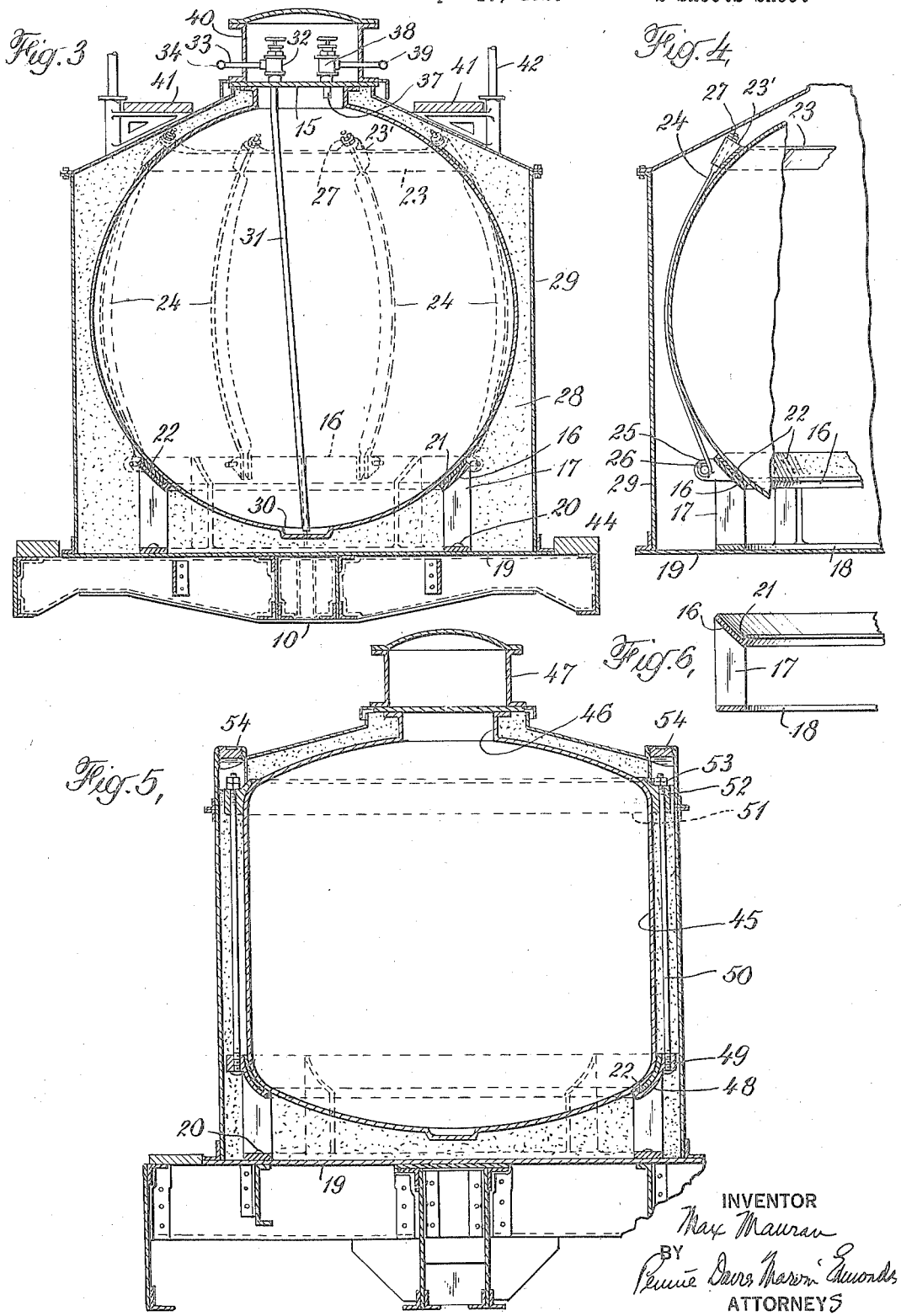

Patented Oct. 2, 1928.

1,685,926

UNITED STATES PATENT OFFICE.

MAX MAURAN, OF NIAGARA FALLS, NEW YORK, ASSIGNOR TO THE MATHIESON ALKALI WORKS, INC., OF NEW YORK, N. Y., A CORPORATION OF VIRGINIA.

MULTIUNIT TANK CAR.

Application filed September 15, 1926. Serial No. 135,554.

This invention relates to improvements in multiple unit tank cars for the transportation of liquids, and particularly liquids transported under pressure, such as liquefied gases.

In the transporttation of such gases as liquefied chlorine, it has been customary to use containers or drums of one-ton capacity or less, these drums being specially constructed to withstand high pressures. These drums are sometimes secured to the car body so that the latter is classified as a tank car but fifteen tons of chlorine is now fixed by the Bureau of Explosives as the maximum amount of chlorine that may be thus shipped, either in multi-unit tank cars or those of the single tank type and consequently the cost of transportation is high because the car is not loaded to the ordinary normal load of a freight car.

Tank cars with a single tank are unsatisfactory for the shipment of liquefied gases, and particularly chlorine, because in order to comply with the tank car specifications now in effect, the tanks must be anchored from the center. This necessitates riveting a casting to the bottom of the tank and the rivets are quickly attacked by gases of a corrosive character. Sometimes a plate or apron is placed on the inside of the tank over the rivet heads but this requires a long longitudinal weld in the most vital part of the tank so far as strength is concerned and the tank is undoubtedly weakened.

Also the provision of insulation around the tanks involves the use of molded cork material which is removed only with difficulty when the tank is to be inspected and this makes inspection an expensive operation. The transportation of liquefied gases in a tank car of this description is consequently expensive and attended by considerable risk.

Since tank cars employed for the transportation of liquefied gases are ordinarily constructed for this one purpose only, it is desirable that the cars used should be capable of transporting the maximum quantity of the material with the maximum safety, and the car of the present invention is so constructed and arranged that much greater quantities of the gases can be shipped than has heretofore been possible and the shipment may be made with entire safety. In view of the large weights carried, the present car has been especially strengthened at the points where the greatest strains are encountered, and the tanks and their mountings are constructed so that although they carry a quantity of gases having a weight in the aggregate at least equal to the minimum car-load tonnage, these tanks are securely held in position and mounted in such a way that injury to the tanks and strains, which might result in leakage in an ordinary construction, are avoided. Accordingly, the capacity of the present car is utilized to best advantage and the cost of transporting the gases is greatly reduced. Furthermore, the individual tanks are so constructed that their contents may be removed either in gaseous or liquid form and the connections are such that the several tanks may be emptied simultaneously or one at a time.

In that construction of the car which is now considered preferable, the body or frame of the car has a length sufficient to support four tanks, each of which is large enough to hold 7½ tons of liquid chlorine. These tanks may be upright cylindrical tanks, but are preferably of spherical form since the spherical tank is much lighter and stronger than a cylindrical tank of the same capacity. A car of standard size carries four such tanks and they are mounted in a row extending lengthwise of the car, each tank being supported above the level of the car body. The latter, in one construction, includes a central longitudinal girder and cross beams, and each tank is mounted on a support, the weight of which is taken by the girder and a pair of these beams.

This support comprises a cradle member which is preferably continuous and in the form of a ring having an inclined face conforming to the contour of the tank surface with which it engages. This cradle member is supported on a plurality of vertical legs which are in turn connected by a ring at their lower ends, the ring resting on the frame members of the car body and being secured thereto in any suitable manner. Preferably the cradle member, the legs, and the ring are of integral construction and the ring has a channel in its upper surface so that after the tank has been placed on it, calking material, such as molten lead, may be run into the channel, thus insuring that the tank is firmly seated without the necessity of accurate machine work. The tank is further secured in position by means of a clamping ring which is placed near the upper end of the tank and is secured to the body by stay bolts. Preferably these stay bolts extend from lugs on the upper clamping ring to similar lugs on the cradle member, and when a spherical tank is used the stay bolts are of curved shape and are pivotally mounted at their lower ends so that they will readily conform to the wall of the tank when drawn taut.

Each tank is supported on its cradle with its lower end spaced from the top level of the body and insulating material may be used to enclose each tank, a portion of this material lying between the lower end of the tank and the body. A heavy plate is laid on the body before the cradle is placed in position and this plate supports the insulation and also permits the cradle to be secured thereto, the cradle thus being riveted at a plurality of points instead of to the frame members only of the car. The insulating material is enclosed within a housing and may be granular in form so that it is readily removed when inspection is to be made. The housing is provided with openings through which access may be had to the stay bolts so that the latter may be readily reached. Each tank has an opening at its top with the usual dome and cover within which are the control valves for the outlet pipes. These may be in duplicate, extending to the bottom of the tank for the removal of the contents as a liquid, or one may terminate above the normal liquid level so that the contents may be withdrawn as a gas. The several outlets may be connected by mains extending lengthwise of the car, and running boards are mounted on the tanks so that the valves are readily accessible.

The car may also be arranged for the use of compressed air for removing the contents of the tanks in extremely cold weather when the natural pressure of the gas is not sufficient to secure rapid discharge. The air used for this purpose must be free of moisture and the car therefore is provided with a drying cylinder connected to one of the mains, the cylinder containing a drying material such as calcium chloride which absorbs moisture from the air being led into the tanks.

For a better understanding of the invention, reference may be had to the accompanying drawings, in which Fig. 1 is a view in side elevation and partly in section, showing a standard car carrying four spherical tanks, Fig. 2 is a plan view of the car with parts shown in section, as indicated by the line 2—2 of Fig. 1, Fig. 3 is a vertical sectional view taken on the line 3—3 of Fig. 2, Fig. 4 is a sectional view showing the means for securing a tank on its cradle in side elevation, Fig. 5 is a view similar to Fig. 3, but showing a tank of generally cylindrical form, and Fig. 6 is a vertical sectional view through one side of the cradle showing the channel for the calking material.

In these drawings the car body is shown as made up of frame members which include a central box girder 10 and cross beams 11. The cross beam 12 at the end of the group is braced by means of angle beams 13. The central girder is of increased depth at the middle of the car, in accordance with the usual practice. This car is arranged to carry four tanks, each of which is to contain 7½ tons of liquid chlorine. The middle tanks are supported on cradles which lie above a pair of cross beams and each end tank lies directly above the end cross beam 12 which is of greater strength than the intermediate cross beams. The weight of the tanks is thus distributed throughout the length of the car, so that no parts of the car structure are subjected to undue strains.

Each tank 14 in the car shown in Fig. 1 is of spherical form, having an opening 15 at the top, and the tank is mounted on a continuous cradle member 16 (Fig. 6). This cradle member may take the form of an inclined ring, the face of the ring conforming to the slope of the tank wall and the ring is supported on standards or legs 17, a number of which are employed. These legs at their lower ends are connected by a flat ring 18 lying on a plate 19 which forms a floor beneath the tank, and the ring and plate are then secured to the central girder and the cross beams by rivets or bolts 20. The cradle member or ring 16 is formed with a shoulder 21, providing a channel, and in mounting the tank on the cradle member the tank is placed in position and then the channel is filled by means of calking material, as indicated at 22. For this purpose molten lead may be used, and this provides a firm seating for the tank without the necessity of accurate machining.

The tank is held in position in its cradle by means of an upper clamping ring 23, which has an inclined face resting against the tank wall. This clamping ring is secured to the body of the car, preferably by means of stay bolts 24, which are secured to lugs 25 extending outwardly from the cradle member 16. The stay bolts are curved to conform to the curvature of the outer wall of the tank and at its lower end each stay bolt is pivotally mounted, as by means of a hinge pin 26, suitably secured between spaced lugs 25. At its upper end the stay bolt passes through the lug 23′ and its exposed end carries a nut and lock nut generally indicated at 27.

With this construction the weight of the tank and its contents wedge the tank firmly into the seat provided by the cradle and the tank is further held in position by means of the clamping ring and stay bolts. The tank is thus secured against swaying and shifting and an unusually secure mounting is obtained. The tank lies with its lower end spaced from the floor plate 19 and surrounding the tank and occupying the space between its lower end and the floor plate is a mass of insulation 28. This insulating material is enclosed in a metal housing 29, which extends up to the neck of the tank defining the opening 15. The contents of the tank are thus protected against temperature changes which might develop dangerous pressures.

At its lower end the tank has a depression or sump 30, into which extends the outlet pipe 31, the upper end of which is provided with a valve 32 connected by a pipe 33 to a main 34. This main extends lengthwise of the car and is provided with expansion bends 35. The main has a suitable outlet connection, as at 36, to which a draw-off pipe may be connected. The outlet pipe 31 provides a means for withdrawing the contents of the tank in liquid form. Another outlet pipe 37, permitting the contents to be withdrawn as a gas, terminates above the normal liquid level. It is provided with a valve 38 and an outlet pipe connected to the main 39 similar to the main 34. The valves lie within a dome or housing 40 which may readily be removed to permit access to them. On top of the tanks and extending lengthwise thereof on either side of the domes, are running boards 41, provided with railings 42. At the ends these running boards have ladders 43 leading down to the floor of the car.

In the construction illustrated in Fig. 5, the tank 45 is of cylindrical form having an opening 46 at its top with the usual dome 47, the outlet connections and valves not being shown. This tank is supported on a cradle member of a construction similar to that previously described. The upper ring 48 of the cradle member has outwardly extending lugs 49 in which the lower ends of the stay bolts 50 are secured. Preferably the bolts are threaded into the lugs and the lower ends upset to form rivet heads. Each tank is provided with a clamping ring 51, which has a portion resting on the vertical side wall of the tank and another part which overlies the inclined head of the tank. This clamping ring is provided with a plurality of lugs 52 which lie directly above the lugs 49 and the stay bolts extend between lugs and at their upper ends are provided with nuts and lock nuts 53. In order to afford access to the lugs for adjustment, the sheathing of insulation is provided with an opening closed by a plug 54. This opening lies directly above the end of the stay bolt and by removing the plug a tightening tool may be inserted. A similar construction may be provided in connection with the spherical tank construction, if desired.

In order to permit the use of compressed air to assist the natural pressure of the gas within the containers in the removal of their contents, the car may be provided with an air dryer generally designated 55. This dryer is in the form of a cylinder mounted at any convenient point on the car frame as at the middle and in the angle between a pair of tanks. This dryer is arranged for ready inspection and filling with the drying material and may comprise a steel cylinder 56 having a flanged top 57. Bolted to the top is a cover 58 provided with a gasket 59 so that the joint between cylinder and cover may be made tight. The drying material such as calcium chloride is held in a basket 60 which has a flange at its upper end by which it may be secured to the cover, a gasket being placed between the cover and the flange of the basket to make a tight joint. The basket is of less diameter than the enclosing cylinder and also of less length. Its bottom is perforated and in the side wall of the cylinder 56 near the top is an air inlet pipe 61, the air flowing down in the annular space between the basket and the cylinder, then up through the basket and out through an outlet 62 in the cover. The inlet pipe 61 may be connected to any suitable source of compressed air which passes through the dryer and is freed of moisture. The outlet pipe 62 is connected by a union 63 to a pipe 64 leading to the main 39, which leads to the tank outlets 37 terminating above the normal liquid level. A valve 65 permits control of the flow of air. The cover 58 of the dryer is provided with an eye 66, and when the dryer is to be charged, the cover bolts are unloosened, and the cover with the basket lifted off the cylinder, the basket then being freed from the cover by removal of its holding bolts.

It will be seen that with this car a quantity of liquefied gases equal to the minimum carload tonnage may be transported and thus the capacity of the car is utilized to a much greater extent than is the case with the cars on which only fifteen one-ton drums are mounted. The tanks, while normally forming a permanent part of the car, may be readily removed for repair, if necessary, by removing the sheathing of insulation and releasing the stay bolts. The filling and discharge of the tanks is a simple matter since each tank is provided with means for discharging the contents either as a gas or a liquid, and these connections lead to a main by which all of the tanks may be filled or emptied in one operation. While the cylindrical tank is suitable for many purposes, I prefer to employ the spherical tank, since it may be made stronger and has a greater capacity than a cylindrical tank of the same weight.

I claim:

1. In a car of the type described, the combination of a body, a plurality of tanks mounted at different points lengthwise of the body, means for supporting each tank comprising a continuous cradle member extending around the lower end of the tank and carrying the tank, a plurality of legs supporting the cradle member and mounted on the body, and means secured to the upper end of the tank for holding the latter in position on the cradle member.

2. In a car of the type described, the combination of a body, a plurality of tanks mounted at different points lengthwise of the body, means for supporting each tank comprising a continuous ring extending around the lower end of the tank and carrying the tank, a plurality of legs supporting the cradle member and mounted on the body, and means secured to the upper end of the tank for holding the latter in position on the cradle member.

3. In a car of the type described, the combination of a body, a plurality of tanks mounted at different points lengthwise of the body, means for supporting each tank comprising a ring extending around the lower end of the tank and carrying the tank, a plurality of legs formed integral with the ring and mounted on the body to support the ring, and means secured to the upper end of the tank for holding the latter in place on the cradle member.

4. In a car of the type described, the combination of a body, a plurality of tanks mounted at different points lengthwise of the body, means for supporting each tank comprising a pair of rings one secured to the car body and the other supporting the lower end of the tank, legs extending between the rings, and means secured to the upper end of the tank for holding the latter in place on the upper ring.

5. In a car of the type described, the combination of a body, a plurality of tanks mounted at different points lengthwise of the body, means for supporting each tank comprising a continuous ring having a channel formed in its upper surface, calking material filling this channel, the tank resting on the ring and the calking material, a plurality of legs supporting the ring and mounted on the body, and means secured to the upper end of the tank for holding the latter in place on the cradle member.

6. In a car of the type described, the combination of a body, a plurality of tanks mounted at different points lengthwise of the body, means for supporting each tank comprising a continuous cradle member extending around the lower end of the tank and carrying the tank, a plurality of legs supporting the cradle member and mounted on the body, and means secured to the cradle member and the upper end of the tank for holding the latter in place on the cradle member.

7. In a car of the type described, the combination of a body, a plurality of tanks mounted at different points lengthwise of the body, means for supporting each tank comprising a continuous cradle member extending around the lower end of the tank and carrying the tank, a plurality of legs supporting the said cradle member and mounted on the body, a clamping ring resting on the upper end of the tank, and means connecting the cradle member and the clamping ring for holding the tank in position on the cradle member.

8. In a car of the type described, the combination of a body, a plurality of tanks mounted at different points lengthwise of the body, means for supporting each tank comprising a continuous cradle member extending around the lower end of the tank and carrying the tank, a plurality of legs for supporting the cradle member spaced above the car body, means secured to the cradle member and the upper end of the tank for holding the latter in place on the cradle member, insulating material enclosing the tank and the securing means, and means for giving access to the securing means through the insulating material to permit the adjustment of the securing means.

9. In a car of the type described, the combination of a body, a plurality of spherical tanks mounted at different points along the body, separate means on the body receiving the lower end of each tank for supporting the latter, and means engaging the upper end of each tank for holding the latter in place.

10. In a car of the type described, the combination of a body, a plurality of cradle members along the body, a spherical tank supported on each cradle member above the level of the body, and means engaging the upper end of each tank for securing it against movement in its cradle member.

11. In a car of the type described, a plurality of spherical tanks disposed at different points along the body, a cradle for each tank including a plurality of legs supported at their lower ends on the body and secured thereto, and a plurality of stay bolts secured at one end to the body and at the other end to the upper end of the tank.

12. In a car of the type described, a plurality of spherical tanks disposed at different points along the body, a cradle member for each tank secured to the body and supporting the latter above the level of the body, a sheathing enclosing each tank, and insulating material between the tank and the sheathing and under the tank.

13. In a car of the type described, a plurality of spherical tanks at spaced points along the car body, a cradle for each tank comprising a ring secured to the body on which ring the tank is seated, another ring encircling the upper end of each tank and a plurality of stay bolts extending between the rings and pivotally secured to one ring.

14. In a car of the type described, the combination of a body, a plurality of spherical tanks disposed along the body, a support for each tank comprising a ring on which the tank rests, a ring encircling the tank near its upper end, lugs extending outwardly from the rings, stay bolts connecting the lugs, and a plurality of legs secured to the body and supporting the lower ring.

15. In a car of the type described, the combination of a body, a tank mounted thereon, a discharge pipe for the tank having its inlet end below the normal liquid level in the tank, an inlet for admitting air under pressure to the tank above the normal liquid level, and a dryer connected to the inlet through which the air admitted to the tank passes.

16. In a car of the type described, the combination of a body, a plurality of tanks mounted thereon, a discharge pipe for each tank having its inlet end below the normal liquid level in the tank, an inlet for each tank for admitting air under pressure into the tank above the normal liquid level, a main connecting the air inlets and a dryer connected to the main through which the air passes in its flow to the main.

17. In a car of the type described, the combination of a body, a plurality of tanks mounted thereon, a discharge pipe for each tank having its inlet end below the normal liquid level in the tank, an inlet for each tank for admitting air under pressure into the tank above the normal liquid level, a main connecting the air inlets, a dryer connected to the main through which the air passes in its flow to the main, and a valve between the main and the dryer.

18. In a car of the type described the combination of a body, a plurality of tanks mounted at different points lengthwise of the body, means for supporting each tank comprising a continuous cradle member extending around the lower portion of the tank and carrying the tank, a heavy plate firmly secured to the body, a plurality of legs supporting the cradle member and mounted on the plate, and means secured to the cradle member and the upper end of the tank for holding the latter in place on the cradle member.

19. In a car of the type described, the combination of a body, a plurality of spherical tanks mounted at different points lengthwise of the body, means for supporting each tank comprising a circular cradle member, a heavy plate firmly secured to the body, a plurality of legs supporting the cradle member and mounted on the plate, a clamping ring resting on the upper end of the tank and means connecting the cradle member and the clamp ring for holding the tank in position on the cradle member.

20. In a car of the type described the combination of a body, a plurality of spherical tanks mounted at different points lengthwise of the body, a heavy plate firmly secured to the body, means for supporting each tank comprising a cradle member, a plurality of legs supporting the cradle member and mounted on the plate, insulating material resting on the heavy plate and covering the bottom surface of the tank, and means secured to the cradle member and the upper end of the tank for holding the latter in place on the cradle member.

In testimony whereof I affix my signature.

MAX MAURAN.